(12) United States Patent
Parker

(10) Patent No.: US 10,048,411 B2
(45) Date of Patent: Aug. 14, 2018

(54) OPTICAL EFFECT STRUCTURES

(76) Inventor: Andrew Richard Parker, London (GB)

( * ) Notice: Subject to any disclaimer, the term of this patent is extended or adjusted under 35 U.S.C. 154(b) by 696 days.

(21) Appl. No.: 13/806,474

(22) PCT Filed: Jun. 27, 2011

(86) PCT No.: PCT/GB2011/051218
§ 371 (c)(1),
(2), (4) Date: Nov. 6, 2015

(87) PCT Pub. No.: WO2011/161482
PCT Pub. Date: Dec. 29, 2011

(65) Prior Publication Data
US 2016/0116645 A1    Apr. 28, 2016

Related U.S. Application Data

(60) Provisional application No. 61/344,306, filed on Jun. 25, 2010.

(51) Int. Cl.
*G02B 5/02* (2006.01)
*B05D 5/06* (2006.01)
(Continued)

(52) U.S. Cl.
CPC ........... *G02B 5/0221* (2013.01); *B05D 5/061* (2013.01); *G02B 5/0226* (2013.01);
(Continued)

(58) Field of Classification Search
CPC . G02B 5/00; G02B 5/02; G02B 5/021; G02B 5/0215; G02B 5/0221;
(Continued)

(56) References Cited

U.S. PATENT DOCUMENTS 2,519,546 A   8/1950   Colbert et al.
2,624,238 A   1/1953   Widdop et al.
(Continued)

FOREIGN PATENT DOCUMENTS

CN   101738648 A   6/2010
EP   2585862 B1   11/2016
(Continued)

OTHER PUBLICATIONS

Jason D. Forester, et al., "Biomimetic Isotropic Nanostructures for Structural Coloration." Advanced Material Views, Feb. 22, 2010, pp. 2939-2944.
(Continued)

*Primary Examiner* — Robert E Tallman
(74) *Attorney, Agent, or Firm* — Bacon & Thomas, PLLC

(57) ABSTRACT

The present invention provides an optical coating structure (10) applied to the surface of an object. "Scattering structures" are introduced to the basal, upper or middle layers of a multilayer reflector to cause a particular (calculated) degree of scattering, or to the surface of a black/color pigmented object to cause either enhanced transmission at the environment-object interface or omni-directional (as opposed to directional) reflections of which only a narrow portion can be observed. The scattering structures are mainly sub-micron in size, and arranged in a pseudo-random or non-periodic manner so as to prevent significant diffraction by themselves. Consequently they serve only to broaden the angular range of the light reflected at the surface normal from a multilayer reflector, or to provide (actual and/or perceived) reduced reflectivity of a surface by deflecting incident light through the surface rather than away from it or by scattering otherwise beam-like (narrow-angle) reflections from a surface into a broad-angle reflection. The scattering structures may comprise profile elements (12), which are in
(Continued)

the form of elongate bars having convexly curved sides or hemispherical rods, that are introduced to a basal layer of a multilayer reflector. The layers of the multilayer reflector follow the convex curve of the bars or rods to form a distorted reflector structure.

16 Claims, 8 Drawing Sheets

(51) Int. Cl.
*G02B 5/28* (2006.01)
*G02B 5/08* (2006.01)
*G02B 5/26* (2006.01)

(52) U.S. Cl.
CPC ......... *G02B 5/0242* (2013.01); *G02B 5/0284* (2013.01); *G02B 5/0833* (2013.01); *G02B 5/26* (2013.01); *G02B 5/285* (2013.01)

(58) Field of Classification Search
CPC .. G02B 5/0226; G02B 5/0231; G02B 5/0247; G02B 5/0284; G02B 5/0278
USPC ......... 359/270, 290–295, 297, 478–479, 615
See application file for complete search history.

(56) References Cited

U.S. PATENT DOCUMENTS

| | | |
|---|---|---|
| 4,066,280 A | 1/1978 | LaCapria |
| 4,554,727 A | 11/1985 | Deckman et al. |
| 4,856,857 A | 8/1989 | Takeuchi et al. |
| 2006/0104084 A1 | 5/2006 | Amemiya et al. |
| 2007/0160811 A1 | 7/2007 | Gaides et al. |
| 2008/0044943 A1* | 2/2008 | Mazur ................... H01L 21/268 438/95 |
| 2009/0179418 A1* | 7/2009 | Stalder ................. G02B 5/0221 283/85 |
| 2009/0284836 A1 | 11/2009 | Boyd et al. |
| 2009/0317595 A1 | 12/2009 | Brehm et al. |
| 2010/0060987 A1* | 3/2010 | Witzman ............... G02B 5/286 359/589 |
| 2010/0080938 A1* | 4/2010 | Toda ..................... B41M 3/148 428/30 |
| 2011/0176213 A1 | 7/2011 | Yang et al. |

FOREIGN PATENT DOCUMENTS

| | | |
|---|---|---|
| JP | 2006085050 A | 3/2006 |
| WO | 2008066520 A1 | 6/2008 |
| WO | 2008082421 A1 | 7/2008 |
| WO | 2008122927 A1 | 10/2008 |
| WO | 2009011961 A2 | 1/2009 |
| WO | 2009052052 A1 | 4/2009 |
| WO | 2009085581 A1 | 7/2009 |
| WO | 2010056258 A1 | 5/2010 |
| WO | 2010090924 A2 | 8/2010 |

OTHER PUBLICATIONS

Ainsley Seago, et al., "Gold bugs and beyond: a review of iridescence and structural colour mechanisms in beetles (Coleoptera)" Journal of the Royal Society Interface, vol. 6, Oct. 28, 2008, pp. S156 to S184.

* cited by examiner

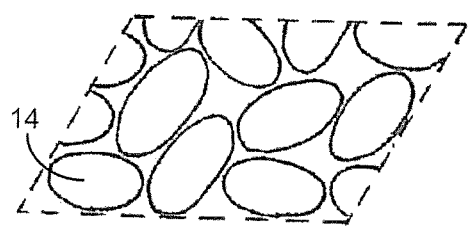 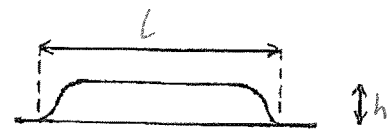
FIG. 4  FIG. 4A
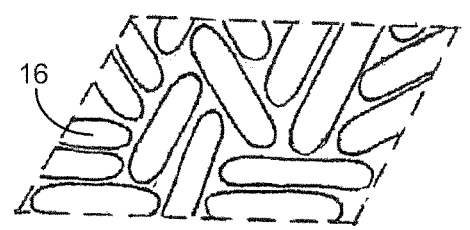 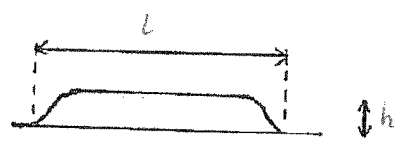
FIG. 5  FIG. 5A
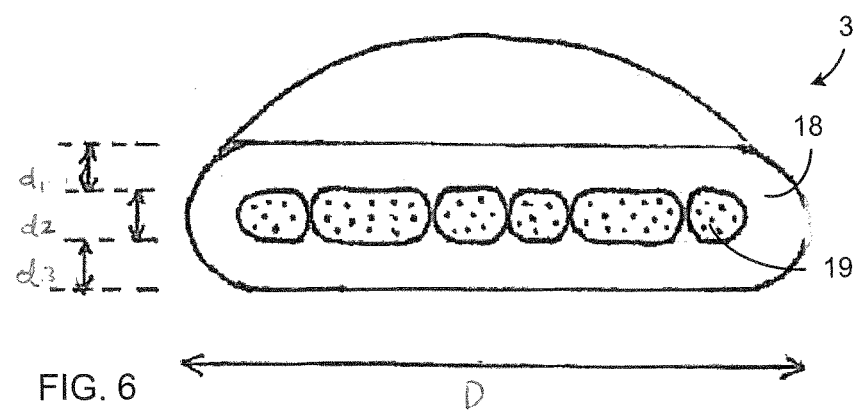
FIG. 6

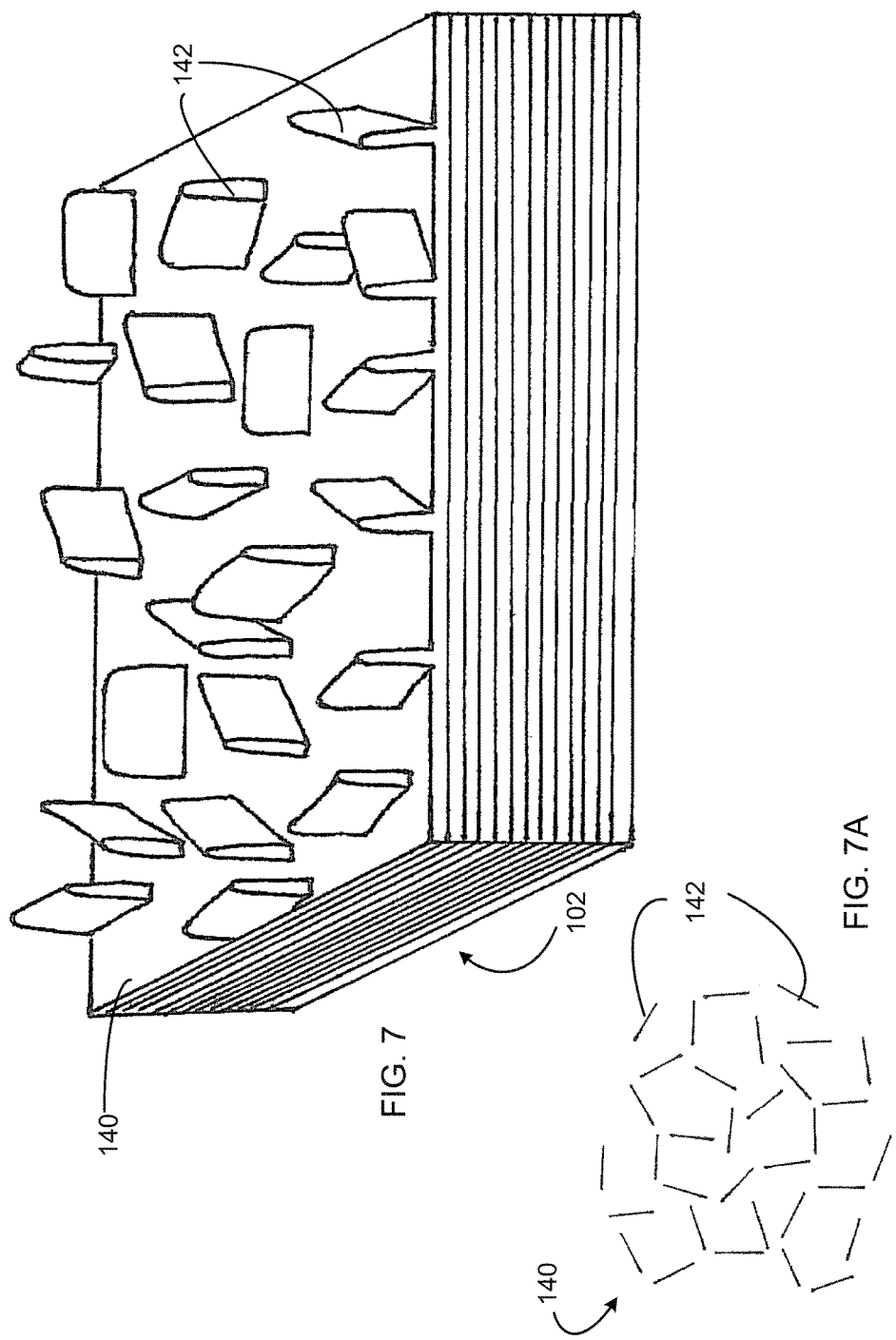

OPTICAL EFFECT STRUCTURES

FIELD

The present invention relates to optical effect structures, in particular to an optical coating structure for imparting a desired colour or matt effect to an object when applied onto its surface and to structures formed or applied to the surface of a black/colour pigmented object to cause either enhanced transmission at the environment-object interface or omni-directional reflections of which only a narrow portion can be observed.

BACKGROUND

An optical coating structure is a stack of one or more thin layers of material deposited on a substrate or object in a way that alters the way in which the object reflects and transmits light. The thin layers are deposited typically to a thickness of between 10 nm to 200 nm.

For example, a quarter-wave stack reflector is a well-known building block of optical thin-film products. Such a stack generally comprises alternating layers of two or more dielectric materials with different refractive indexes, in which each layer has an optical thickness (i.e., the geometric thickness of the layer multiplied by the refractive index of the layer material) that corresponds to one-quarter of the principal wavelength of reflection. Here, the wavelength of light reflected varies with angles of incidence and reflection, thus one can observe different colours at different viewing angles; a visual effect known as iridescence.

In this manner, an optical coating structure can be constructed to accurately and selectively reflect certain wavelengths of visible light in order to impart a desired colour to an object. Unlike paints in which the colour is determined by pigments or dyes that are held together with binders, with optical coating structures the transition from near total reflection to maximum transmission can take place over a very short wavelength range, enabling a precise discrimination between different wavelengths. As a result, objects coated with such structures can take on a sharp and well-defined colour, albeit each colour is observable over a narrow range of directions only.

It is known from JP-A-2005/153192 to provide an optical coating structure comprising a base structure that has been etched to provide a surface with a large number of small (less than 500 nm) crevices with sides that extend normal to the surface of the structure. On top of the base structure is a coating made up of two polymeric layers alternately deposited on the substrate, one of the polymeric layers having a high refractive index and the other having a low refractive index. The layers are deposited so that they imitate the uppermost surface of the base structure and as a result each layer, including the uppermost layer of the structure, has the same profile of crevices with sides that extend normal to the surface of the structure.

The structure disclosed in JP-A-2005/153192 provides a chromogen in which the colour changes with the viewing angle and provides a gentle wavelength dispersion, a deep hue and a high reflectivity. The visual effects produced by this device are, at least in part, caused by diffraction effects caused by the crevices formed in the top layer and other layers of the device.

However, it remains desirable to provide an optical coating structure capable of providing a colour that is sufficiently bright and that exhibits a minimal or limited iridescence effect, i.e., so that the colour remains substantially the same over a broad range of viewing angles.

It would also be desirable to provide optical effect structures that can alter the reflectivity of the surface of an object.

SUMMARY

The present invention provides optical effect structures having scattering structures and methods of producing the optical effect structures.

According to a first aspect the present invention can be seen to provide an optical coating structure which has been applied to the surface of an object and which comprises scattering structures, preferably elongate scattering structures. The optical coating structure may comprise a multilayer reflector, which preferably comprises a stack of a plurality of layers of alternating higher and lower refractive index materials. The scattering structures are mainly sub-micron in size. By this it is meant that the main dimensions of the scattering structures, for example, the cross-sectional dimensions as provided by the width and height of the structures, are less than 1.5 µm, more preferably less than 1 µm. The scattering structures may be introduced to the basal, upper or middle layers of a multilayer reflector to cause a degree of scattering in the multilayer reflector. The degree of scattering is calculated in the sense that it is pre-determined and arranged so as to induce the desired optical effect in the coating. The particular arrangement of scattering structures as well as the height, length, width, cross-sectional profile and spacing of the scattering structures, is selected for use with a chosen multilayer reflector (or object), in order to reduce iridescence and/or create additional optical effects as will be explained in greater detail below.

The scattering structures preferably comprise profile elements that induce rounded or curved distortions into the multilayer reflector structure. These are small, subtle distortions that are introduced into the otherwise planar reflector layers. There is preferably no break in the continuity of the reflector layers and the profile elements are configured to avoid diffraction effects, in contrast to the known arrangement in JP-A-2005/153192.

The profile elements are preferably arranged in a two dimensional pattern extending in a plane which is parallel to the surface of the object. The pattern may be described in some contexts as having 2.5D, i.e., it represents something between 2D and 3D. The profile elements are arranged in a random, pseudo-random or non-periodic manner. For example, in a pattern of profile elements where they are arranged in parallel, the scattering structures are of varying lengths and are spaced by varying amounts in order to avoid repeating or periodic patterns, at least in the directions where the dimensions are less than 1.5 µm. In this way it is possible to prevent significant diffraction caused by the profile elements. Similarly in embodiments where the profile elements are not parallel, they are arranged angled and spaced with respect to each other so that there is essentially no periodicity at a level less than 1.5 µm. Any periodicity or repeated elements of the profile elements should be spaced at least 2 µm apart so that they are too far apart to create diffraction effects.

The profile elements preferably comprise an upper, convexly curved surface. The curved surface preferably extends symmetrically either side of an uppermost point where it extends parallel to the underlying substrate surface and has a surface normal coincident with that of the substrate. Surface normals for points along this curved surface may make an acute angle with the surface normal of the underlying substrate of 0° to around 20° or more, more preferably 30°. The subsequently deposited layers of the reflector follow the curvature of the profile elements to create smooth undulations in the reflector structure, so that surface normals for points along the individual reflector layers include the same, or essentially the same, broad range of angles, from parallel through to 20° or more, preferably 30° or more from the surface normal of the substrate. The profile elements are preferably in the form of rounded bars or rods, preferably having height and width dimensions which are approximately the same or within a factor of three ($0.33w \leq h \leq 3w$ where w is the width and h is the height of the profile element).

The spacing of the profile elements is set so as to try to maximise the number of undulations induced in the reflector layers, while at the same time avoiding the distortion effects of the profile elements from interfering with one another. Ideally there should be a small region of flat space between neighbouring undulations where the layers take on their original planar structure. This flat region should be small enough that the next colour cannot be seen to any significant degree from the broader viewing angles. Preferably an average spacing of the profile elements, P, is greater than d×n, where d is the thickness of each layer measured along the surface normal and n is the number of layers. In preferred embodiments P=2dn is used as a minimum spacing in order to reduce the effects of the undulations abutting each other and to provide the small flat regions between, and P=10dn is used as a maximum spacing, beyond which the effects of the lower amount of reflected light from the smaller concentration of undulations and the next colours starting to become more significant in the reflections that are seen, start to become too prominent. In more preferred embodiments the maximum spacing is limited to P=6dn, and most preferably the maximum spacing is set to $P \leq 4dn$. The elongate shape of the preferred bars and rods also helps to increase the packing of the subtle undulations in the reflector layers as well as helping to provide more significant reflections at the broader viewing angles, leading to a visually more striking optical effect.

According to a second aspect the present invention can be seen to provide an optical coating structure which has been applied to the surface of a black-/colour-pigmented object to cause enhanced transmission at the environment-object interface or omni-directional (as opposed to directional) reflections of which only a narrow portion can be observed. The environment may be air, water or any other material in contact with the object. The scattering structures are again mainly sub-micron in size, meaning that main dimensions (e.g., height, width), and in particular the transverse cross-sectional dimensions, are less than 1.5 µm, and arranged in a random, pseudo-random or non-periodic manner so as to prevent significant diffraction by themselves.

In this specification, "pseudo-random" is considered as a random arrangement of several adjacent structures that might reveal some degree of order over a "larger" (several microns) area, such as when examined using a Fourier analysis, so that there is some, but not exclusive, constructive interference of reflected light rays of the same wavelength from the larger area). Consequently, the scattering structures serve only to broaden the angular range of the light of wavelength reflected at the surface normal from a multilayer reflector, or to provide reduced reflectivity of a surface by deflecting incident light through the surface rather than away from it or by scattering otherwise beam-like (narrow-angle) reflections from a surface into a broad-angle reflection. At any given time, the eye detects only a narrow range of the potential angles of reflection from an object (unless extremely close to the object), and global averaging of wavelengths gathered at the retina occurs within that narrow range of detection. Therefore the scattering structures described here provide the visual effect of either (i) a rich, single colour observable over a wide range of angles (for instance up to 45°, more preferably up to 60°, either side of the surface normal), i.e. with minimal iridescent/colour change effect but with an appearance slightly brighter than that of a pigment or dye (where applied to a multilayer reflector), or (ii) a rich, matt black/colour (where applied to a black/colour pigmented object).

Viewed from a third aspect the present invention can be seen to provide an optical effect structure that has been applied to a surface of an object, the structure comprising scattering structures constructed as walls that extend substantially perpendicularly to the surface of the object, the walls being arranged in a pattern that substantially prevents reflections from leaving the surface of the object at angles of 30° or more from a surface normal of the object. The walls may comprise individual elements or they may link together to define closed shapes, preferably as sides of a regular or irregular polygon, in particular a hexagon. In another embodiment the walls may define random curved lines that meet at non-periodic points to form non-uniform spaces. The height of the walls will be dependent on the relative spacing of the walls and the angle of reflections that it is intended to prevent from leaving the surface. There is a compromise to be struck between preventing reflections and the costs of producing the optical effect structure. Preferably height h and average spacing s of the walls satisfy the equation $h \geq 3.5 s$ such that light at angles of 30° or more from the surface normal are prevented from escaping, more preferably $h \geq 5.5 s$ for angles of 20°, more preferably still $h \geq 11.3 s$ for angles of 10°, and most preferably $h \geq 22.8 s$ for angles of 5° or more. The walls preferably have a height in the range of 500 nm-5000 nm, more preferably 1000 nm to 4500 nm, and most preferably between 2000 nm to 4000 nm. The eye also tends not to observe angles of less than about 30° because the observer's head can block incident light within a cone of environment (around the surface normal) when an object is viewed closely from above.

From a fourth aspect the present invention provides a method of forming an optical coating structure comprising: depositing a first material onto the surface of an object to create a base structure comprising a pattern of profile elements, the profile elements having at least a width and a height dimension of less than 1.5 µm; depositing a layer of a second material over the base structure, the second material having a refractive index less than that of the profile elements; and depositing a layer of a third material over the layer of the second material, the third material having a refractive index different to the second material, wherein the layers of the second and third materials are configured to provide a multilayer reflector that has a layer structure which is distorted by the profile elements of the base structure to create a plurality of undulations in the layers.

Forming the profile elements by printing is advantageous because this tends to give rise to the desired rounded shape easily. The profile elements may also be formed by stamping. The profile elements are preferably distinct elements but they could be linked by webs of the first material extending between them, for example, formed during the stamping operation.

Preferably additional alternating layers of the second and third materials are deposited onto the optical coating structure to form a more complex multilayer reflector with a larger stack of layers. Thus the method may include the steps of applying a second layer of the second material over the third material; applying a second layer of the third material over the second material; and repeating these steps at least one or more times. Layers of additional materials may also be incorporated into the multilayer reflector. One or more layers of different material(s) may be applied to the uppermost layer of the multilayer reflector. For example, the method may include the step of depositing a covering layer of an optically inactive material onto the multilayer reflector. It may include a further step of adhering a cut crystal or a cut glass element to the covering layer.

Viewed from a fifth aspect the present invention provides a method of forming an optical effect coating comprising: providing an object having a surface; depositing a material onto the surface and forming scattering structures constructed as walls that extend substantially perpendicularly to the surface of the object, the walls being arranged in a pattern that substantially prevents reflections from leaving the surface of the object at angles of 30° or more from a surface normal of the object. Preferably the scattering structures are formed by stamping.

BRIEF DESCRIPTION OF THE DRAWINGS

The drawings, described below, are for illustration purposes only. The drawings are not intended to limit the scope of the applicant's teachings in any way.

For a better understanding of the embodiments and to show more clearly how they may be carried into effect, reference will now be made, by way of example only, to the accompanying drawings, in which:

FIGS. 4, 4A, 5 and 5A are sectional views of alternative base layers for the stacked optical structure;

FIG. 6 is a perspective view of a section through a flake comprising an optical structure in accordance with another embodiment;

FIGS. 7 and 7A are perspective and top views of a top layer with a pseudo random structure for a standard quarter-wave stack optical structure in another embodiment;

Figure 3A:
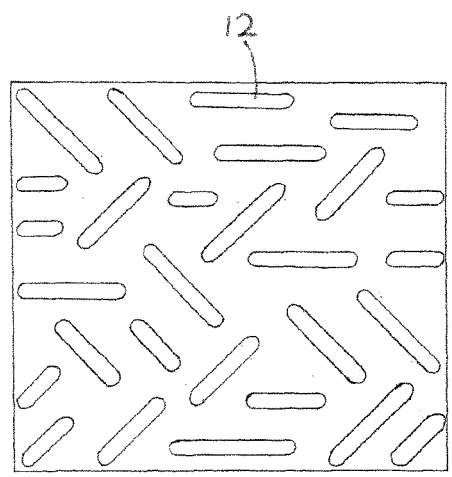
FIGS. 3A and 3B are views of a preferred arrangement of profile elements on a base layer provided as hemispherical rods arranged at angles to each other (FIG. 3A) or parallel to each other (FIG. 3B)
Figure 3B:
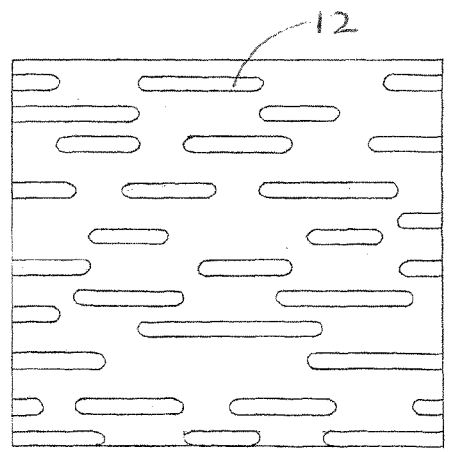

For simplicity and clarity of illustration, in general, elements shown in the figures have not necessarily been drawn to scale. For example, the dimensions of some of the elements may be exaggerated relative to other elements for clarity. However the patterns of hemispherical rods shown in FIGS. 3A and 3B are drawn to scale.

DETAILED DESCRIPTION OF PREFERRED EMBODIMENTS

Figure 1B:
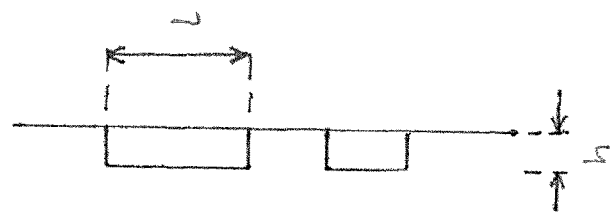
FIGS. 1, 1A, and 1B are perspective and cross-sectional views of a base layer of an optical structure in a first embodiment.
Figure 1:
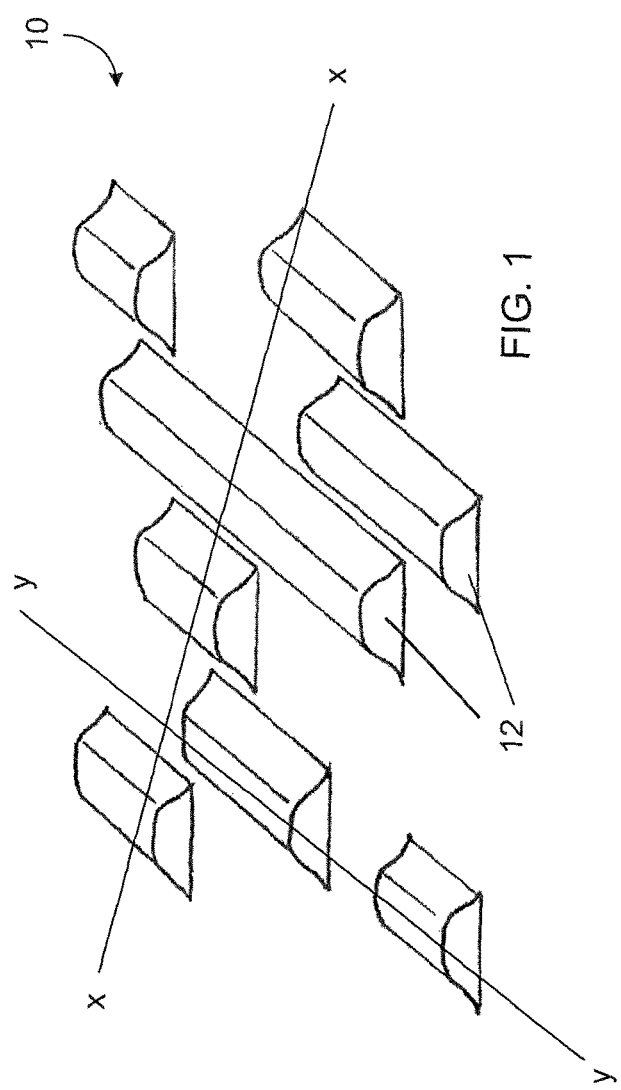
Figure 1A:
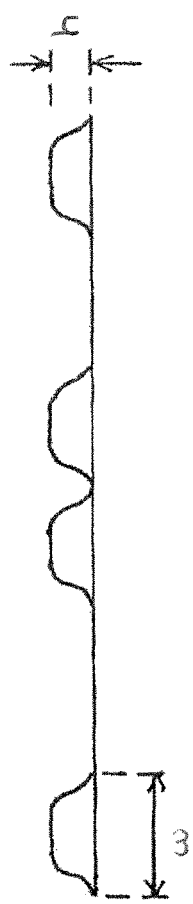

FIG. 1 is a perspective view of a base layer 10 of an optical coating structure 2 (shown in FIG. 2A) in accordance with a first embodiment of the present invention. FIG. 1A shows a cross-sectional view of base layer 10 taken approximately along the line x-x in FIG. 1, and FIG. 1B shows a cross-sectional view of base layer 10 taken approximately along the line y-y in FIG. 1. As described below, base layer 10 comprises profile elements 12 arranged in a pseudo-random scattering pattern so that layers deposited onto base layer 10 generally take on the same profile as layer 10.

Figure 2A:
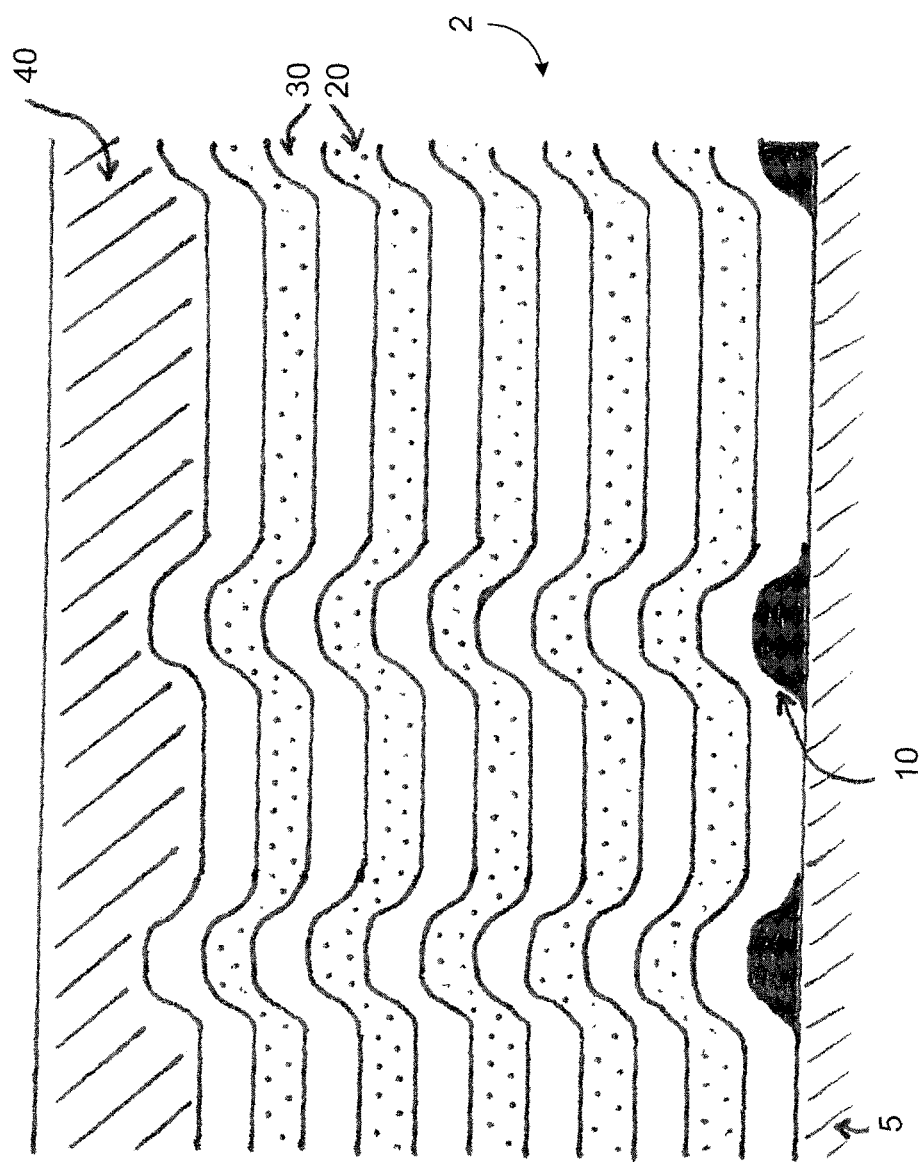
FIG. 2A is a cross-sectional view of a stacked optical structure incorporating the base layer of FIG. 1

More particularly, optical coating structure 2 comprises a plurality of layers of material deposited onto a substrate 5 to form a multilayer reflector as shown in FIG. 2A. Substrate 5 may be any article onto which a desired colour is to be imparted. For example, optical coating structure 2 can be applied to larger surfaces such as glass or crystal ornaments, glass, crystal, metal or polymer jewellery, or to smaller surfaces such as flakes for cosmetics or paints. Above base layer 10, structure 2 comprises a flat-layered quarter-wave stack comprising alternate layers of two different materials 20, 30 with different refractive indices (n) but each with the same optical thickness (actual or geometric thickness× n=¼λ). In the illustrated example, there are five pairs of such layers, but more or less layers may be used depending on the application. In alternative embodiments, a chirped stack with dielectric layers of varying thickness may be used. As is well known, such chirped spaces can be designed to reflect varying wavelengths of light between the layers 20, 30. Chirped structures may for instance be preferred where the desired colour is gold or silver.

Referring still to FIG. 2A, optical coating structure 2 may also include a further optically inactive top covering layer 40 where desirable to protect the stack and prevent it from detaching from substrate 5. Layer 40 is preferably of a transparent and durable material. The layer 40 may include a cut crystal or a cut glass element to result in an object with the appearance of a gemstone. It is important when a covering layer is applied to the coating that no air is trapped, for example in the dips which form between the curved parts of the uppermost layer, as this will affect the optical effect observed. These gaps should be filled with a material which has a refractive index which matches the uppermost layer or the covering layer.

In general, the specific dimensions of the layers in optical coating structure 2 will vary depending on the nature of the substrate 5 and on the desired colour to be imparted. For example, to impart a rich red colour of a wavelength of approximately 620 nm on a crystal substrate with minimal iridescence at viewing angles between about 0°-60° from a normal to the surface, the following dimensions may be used. The profile elements 12 may be shaped like elongated bars of varying length and with slightly convexly curved sides, that are arranged in a grid.

The profile elements 12 may have a typical or average base width of about 200 nm to 500 nm, more preferably 250 nm to 450 nm. In one preferred embodiment the profile elements are between 350 nm to 450 nm, more preferably 425 nm. In another, the profile elements are between 250 nm and 400 nm, more preferably around 310 nm. The profile elements may have a height of between 50 nm to 250 nm, more preferably between 100 nm to 200 nm. For red colours it has been found that heights of between 150 nm to 160 nm, more preferably about 155 nm work well. In general for multilayer reflectors of five or more layers, the profile elements produce a good effect when they are a height of about 2 to 4 layers, more preferably 3 layers. The width of the profiled element is generally about twice or three times the height. The length of the profile elements 12 may vary from about 1000 nm to about 5000 nm, more preferably 2100 nm to 3500 nm. Each layer of material 20, 30 has an actual thickness ($d_{20}$ and $d_{30}$) of the order of 50 nm to 150 nm for producing colours in the visible range, more preferably about 100 nm for a red colour depending on the materials used, whereby their optical thickness ($d_{20} \times n_{20}$, or $d_{30} \times n_{30}$) is equal to a quarter of the wavelength of the desired light reflected at the surface normal (i.e. that representing the desired colour observed). As will be appreciated, by varying these dimensions, different colours can be produced. For example, by reducing the dimensions, lower wavelength colours (such as violet) can be produced.

In terms of materials, the profile elements 12 of the base layer may comprise a transparent or black-coloured material of significantly different refractive index to material 30, for example it may have a difference of at least 0.4, more preferably 0.5 or more. The materials used in layers 20 and 30 are generally dielectric materials such as silicon dioxide, titanium dioxide, zinc sulfide, magnesium fluoride and tantalum pentoxide. Similarly, covering layer 40 may comprise silicon dioxide or various (optically transparent) glasses.

The various layers of the optical coating stack may be produced and applied onto substrate 5 using a number of fabrication steps well-known to those of ordinary skill in the art such as printing, ion beam deposition, physical vapour deposition, molecular beam epitaxy or sputter coating. Base layer 10 and notably profile elements 12 may for example be formed by deposition of material such as via printing techniques, by etching (e.g. lithographic/photochemical techniques, or other known methods used on silicon chips) or by stamping.

Advantageously, by arranging the profile elements 12 in a pseudo-random scattering pattern, their optical effect on the multilayer stack will be to reduce the stack's property of colour change with changing angle, so that the substrate will take on a single colour that is visible from a wide range of angles with little or no iridescence. Such a colour is generally brighter than most pigments while possessing a subtle and rich appearance that is not metallic-like.

In known manner, a pseudo-random number generator (PRNG), can be used to generate a pseudo-random or low discrepancy sequence that exhibits statistical randomness (even though generated by a deterministic causal process) to influence the formation of base layer 10 onto substrate 5. Effectively, if the profile elements 12 are too ordered, they will cause some (undesirable) iridescence (significant colour change with angle through diffraction); if the profile elements 12 are arranged too randomly, the loss of a single, pure colour may result through excessive scattering. If the profile elements are arranged completely randomly, it is important that the profile elements are sufficiently large and not too close to each other. Once the pattern having sufficient non-order has been generated, a tile for stamping the pattern or a mask for use in deposition of the pattern can be produced, and the pattern can then be repeatedly stamped or deposited across the surface of the object (the order at the larger scale of the stamp/mask repeats not being significant to the optical effect).

The profile elements include a curved surface extending either side of the object surface normal. The curved surface can be the slightly convex profile of the bars mentioned above and shown in FIGS. 1, 1A and 2A, a more elliptical profile of a more rounded bar (not illustrated), or more preferably a substantially hemispherical surface provided by an elongate rod as shown in FIGS. 2B, 3A and 3B, and discussed below.

Figure 2B:
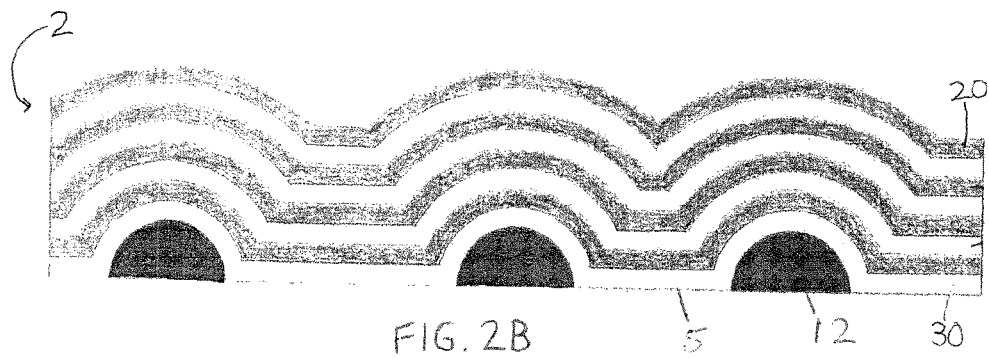
FIG. 2B is a cross-sectional view of a stacked optical structure incorporating a base layer provided with profile elements in the form of hemispherical rods.

FIG. 2B shows a cross section of an embodiment in which the profile elements 12 are elongate rods/bars with an approximately semi-circular cross section. In the optical coating structure shown, the profile elements 12 have been deposited below a multilayer reflector 2. The multilayer reflector 2 comprises eight quarter-wave layers 20, 30 which are made from two alternating materials of different refractive index. There are four layers of each of the two materials, one of the materials having a higher refractive index and the other having a lower refractive index, the thicknesses of the respective layers 20, 30 being chosen to produce a desired colour. Although eight layers 20, 30 are shown here, there could be less or more layers, and preferably between 4 and 20 layers. The reflector layers are formed from any suitable material, for example dielectric materials such as silica oxides or titanium oxides, and in particular silicon dioxide, titanium dioxide, zinc sulphide, magnesium fluoride and tantalum pentoxide. A covering layer or layers may be provided on top of the multilayer reflector in the same way as FIG. 2A if desired. As previously mentioned, this covering layer may include cut crystal or cut glass.

As shown in FIG. 2B, in practice when the layers of a multilayer reflector are deposited on a base layer or structure that incorporates the rounded profile elements, the reflector layers 20, 30 will become distorted and will follow, to an extent, the curved shape of the cross section of the profile elements 12. The profile of the distortion in the layers 20, 30 preferably gradually increases in size with distance away from (i.e., height above) the profile elements 12. In other words, the distortion preferably affects a larger area as it rises up the layers 20, 30 from the surface of the substrate 5 to the uppermost layer of the multilayer reflector 2. In the embodiment shown in FIG. 2B, the semi-circular cross section of the profile elements 12 causes the layers 20, 30 above the rods 12 to follow a curved path with an increasing radius of curvature for the layers that are further away from the profile elements 12.

As previously mentioned, at any given time the eye detects only a narrow range of the potential angles of reflection from an object, and global averaging of the wavelengths gathered at the retina occurs within that narrow range of detection. As known, the colour of light observed at a particular angle will depend on the optical distance of each layer 12 through which the light travels. When a multi-layer reflector 2 is viewed normal to the underlying substrate 5 the light will travel a distance through each layer which is equal to the thickness of each layer 20, 30. As a result, due to interference effects and global averaging in the eye, the colour of light observed normal to the coating will be the colour of light which is determined by the geometrical thicknesses of the layers and the respective refractive indexes of the layers 20, 30. In a normal quarter wavelength stack (i.e. with no underlying profile elements), when viewed from an angle, the light detected by the eye at that angle will have traveled slightly further through each layer (a distance greater than the thickness of each layer) and thus the optical thickness traveled by the light rays will be larger. Light with a longer wavelength will be observed from the broader viewing angles giving rise to iridescence.

However, the presence of the underlying profile elements 12 causes the layers 20, 30 to be distorted. Consequently over a broader range of viewing angles, a significant proportion of the reflector layer surfaces producing the observed reflections will be orientated more to the observer in a way that also substantially maintains the intended thicknesses in the layers of the reflector. As a result the colour observed by the eye over that broader range of angles is relatively constant. The more even that the layer thicknesses can be maintained in the distorted multilayer reflector structure, the better the visual effect that can be achieved.

Additionally it is important that the underlying profile elements 12 are not too close together. If the profile elements 12 are too close together the distortion in the layers 20, 30 will not extend angularly as far and the desired colour will not be seen for the broader viewing angles from the surface normal.

There is a second effect too; the undulations induced into the reflector layers also break up the otherwise flat regions of the reflector into smaller areas where the layers are still flat. If the profile element spacing is made too large then other colours will start to become significant in the reflected light from these flat areas.

A preferred spacing between profile elements 12 for the desired optical effect to be seen is, to an extent, dependent on the cross-sectional size of the profile elements 12 and the thickness of the layers of the multilayer reflector 2. For example, the spacing for a 6 to 10 layer reflector may be 300 nm to 2000 nm, more preferably 500 nm to 1000 nm, and most preferably an average spacing of around 800 nm. The average spacing of the profile elements P is preferably set between the values of P=dn (as a minimum), where d is the thickness of a layer along the normal and n is the number of layers, and P=10dn (as a maximum); more preferably between the values of P=2 dn and P=4 dn.

FIGS. 3A and 3B show plan views of possible patterns of the profile elements 12 deposited below the multilayer reflector 2. In these examples the profile elements are rods with an approximately semi-circular cross section that are arranged in a two dimensional planar array to provide a 2.5D pattern. The figures each show an arrangement where the rods 12 are arranged in a non-ordered manner, so that the profile elements themselves do not give rise to any significant diffraction effects. In FIG. 3A the rods 12 are arranged at diagonals (angles of 45°) and parallel to one another, and in FIG. 3B the rods 12 are arranged parallel to one another. The rods 12 could be arranged at other angles to each other, for example, 60° to each other or could be arranged at random or pseudo-random angles. Combinations of angles or combinations of areas of different angles could also be used. In FIGS. 3A and 3B the rods are on average around 300 nm to 320 nm wide, more preferably about 310 nm wide and so have a radius of 155 nm. The lengths of the rods 12 in FIG. 3A vary between around 1000 nm to 3500 nm, more precisely 1115 nm to 3100 nm. The lengths of the rods 12 in FIG. 3B vary between around 1750 nm to 4500 nm, more precisely 1850 nm to 4470 nm. These dimensions are optimized for a multilayer reflector producing red wavelengths (which are around 620 nm). The size of the elements can be adjusted to produce a different desired colour. For example, the profile elements 12 will be about two-thirds of the size (height and width) to produce violet colours.

These profile elements 12 could be printed using a nano-ink printer or any other known suitable printing device. The use of a nano-ink printer is preferred as the liquid ink will naturally form the hemi-rod shape. Alternatively these base structures could be made by use of a photo mask (litho-graphic photo mask), a stamp (involving nano-imprinting), lithography, or other methods. In the embodiments of FIGS. 3A and 3B, a stamp or mask could be produced with indents or apertures, for example, substantially corresponding to the positions of the rods shown. The periodicity created through repeating the stamp impression across the surface of an object or from using the mask, as long it is significantly larger than 2 μm, would be too large to induce additional diffraction effects. Additionally, a "negative" of the base structure may also be made, where the profile elements 12 are etched into the surface rather than added. The material of the inks will vary, along with the substrates. One possible substrate material type may be glass or silica.

It is also possible to use a mixture of profile elements 12 in the base structure, for example, a mixture of bars and rods, or rods/bars and some other profile shape. The different shapes of profile elements may be mixed up amongst each other or arranged in patches over the object. The profile elements 12 also do not need to be arranged uniformly across the surface of the object. Instead patches of profile elements which are positioned at different angles to each other could be deposited on the surface of the object. The rods/bars etc need also not be linear but instead may have a curved profile in the longitudinal direction. For example, the elongate profile elements may follow a curved or wavy path across the surface of the object.

FIG. 4 is a plan sectional view of another variant for base layer 10 in which the profile elements are elongated oval units 14 with varying orientations. To produce a red light, the profile elements 14 have an average length l of about 2200 nm and a height h of approximately 155 nm, as shown in the profile view in FIG. 4. Similarly, FIG. 5 shows a further variant for base layer 10 in which the profile elements are still-greater elongated oval units 16 with varying orientations. In this case, profile elements 16 may have an average length l of about 3500 nm and a height h of approximately 155 nm to impart a red colour to the substrate. The arrangements shown can be used with comparatively thin reflectors of one or a small number of layers. For thicker multilayer reflectors, the profile elements would need to be more widely spaced.

In another embodiment, FIG. 6 is a perspective view of a cross-section of a flake structure 3 comprising a three-layer quarter-wave stack that is suitable as a structurally-coloured pigment when combined in a binder matrix (as in paint or cosmetics) so that they migrate to the surface of the matrix, as it dries after application and self-organize in a horizontal position at the surface of the matrix (i.e., neighbouring flakes are orientated similarly). Flakes 3 may be generally disc-shaped (as shown), and the pseudo-random organization can be found in layer 19, which in one example may be pseudo-randomly-sized pockets of air contained within a solid transparent material 18 such as silicon dioxide. Flake structure 3 can thus be used as an alternative to a pigment, and can reflect a desired colour using the same principle of broad-angle optical structural colour as described above. As will be appreciated, the embodiment of FIG. 6 is distinct from, for example, the application of the optical structures described in FIGS. 1-5 onto a flat, featureless flake substrate—although the latter flakes may also be similarly mixed in a binder. Preferably the scattering structures are between 50 nm to 250 nm thick, more preferably 100 nm to 200 nm thick, and the surrounding material is around 20 nm to 150 nm thick, more preferably 30 nm to 100 nm thick. In the illustrated example of FIG. 6, the desired colour may again be red if optical thicknesses of $d_1$=55 nm, $d_2$=155 nm, $d_3$=55 nm are employed. The flake may be up to 2 mm in diameter, more preferably less then 0.5 mm in diameter, for example between 5 nm to 500 nm in diameter. Flake structures are also envisaged having additional reflector layers, for example, similar to the embodiments described with reference to FIGS. 1 to 3B.

In another embodiment of the invention, illustrated in FIGS. 7 and 7A, a top layer 140 with a pseudo-random arrangement of profile elements is formed on a standard multilayer reflector 102, such as a quarter wave stack (i.e., with flat layers and without the base layer 10 of FIG. 2). In a variant of this embodiment, the pseudo-random structure of top layer 140 can also be advantageously applied onto a homogeneous black/colour pigmented/dyed material instead of a multilayer reflector.

More particularly, FIGS. 7 and 7A are respectively perspective and top views of coating layer 140 in one such embodiment in which layer 140 comprises a pseudo-random arrangement of profile elements 142. In this embodiment, the elements 142 are shaped like vertical plates which, in the case of red colour coating, may be less than 1250 nm long, more preferably around 1000 nm long, between 100 nm to 200 nm thick, preferably 150 nm thick, and between 500 nm to 1000 nm high, more preferably around 650 nm high. The elements 142 may be made from a transparent material (such as silicon dioxide or a glass) having a refractive index of around 1.5 or higher. The transverse cross-sectional profile may be substantially rectangular (preferably with a rounded top edge as shown), triangular or trapezoidal. Steeply inclined faces (e.g., within 5° of the surface normal) allow the element 142 to release from a stamp. The elements 142 advantageously provide a degree of scattering of the incident and reflected light (on the remainder of stack 102) so that only the colour reflected at the normal by the multilayer reflector 102 is observed (as a result of global averaging in the eye), and at effectively most viewing angles, thereby minimizing the coated article's iridescence (the coated article or substrate is not shown in FIG. 7). In order to enable layer 140 to be robust and to protect it against abrasion in this embodiment, profile elements 142 may be in-filled or covered in another transparent material (such as a different, high refractive index glass) with a refractive index at least 0.4 higher (or lower), more preferably 0.5 higher (or lower) than that of elements 142, and the top surface of this in-fill material may me made smooth and flat. Without the infill material, the colour would have a matt appearance; whereas with the infill material (given a smooth surface at the sub-micron level) the colour would have a gloss appearance. Additional covering layers could also be provided. Alternatively, if no such in-fill material is used, elements 142 may additionally provide a super-hydrophobic or self-cleaning (when wetted) function.

FIGS. 8-11 illustrate different structures for a top covering layer 240 suitable for application on an object (not shown) such as a crystal having a black pigmented or dyed surface. In this embodiment, the structures alter the geometrical angles of the surface to prevent light being reflected from the object's surface and instead cause all incident light to pass through the top covering layer 240 and into the object (through mirror reflections) so that it can be absorbed by the black pigment or dye. Alternatively, they can function to scatter an otherwise beam-like surface reflection to cause a multidirectional reflection that is detected only minimally by the eye which must have a given position (i.e. gathers only reflections with a very narrow range of directions). These structures are therefore able to provide an object with a luxurious matt black colour or appearance without a shiny or reflective effect. Additionally they can be applied to a coloured surface, such as a red crystal, to provide a matt rather than gloss appearance.

Figure 8A:
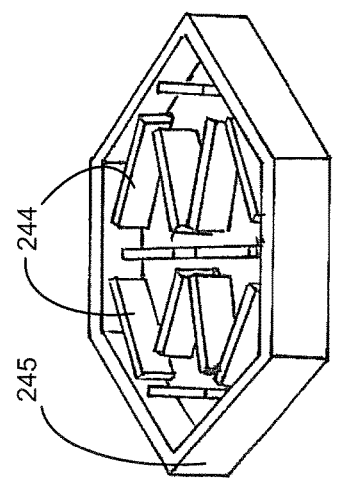
FIGS. 8 and 8A are a top view and a perspective view of a top layer for application on an otherwise smooth surface (at the sub-micron level) in another embodiment.
Figure 8:
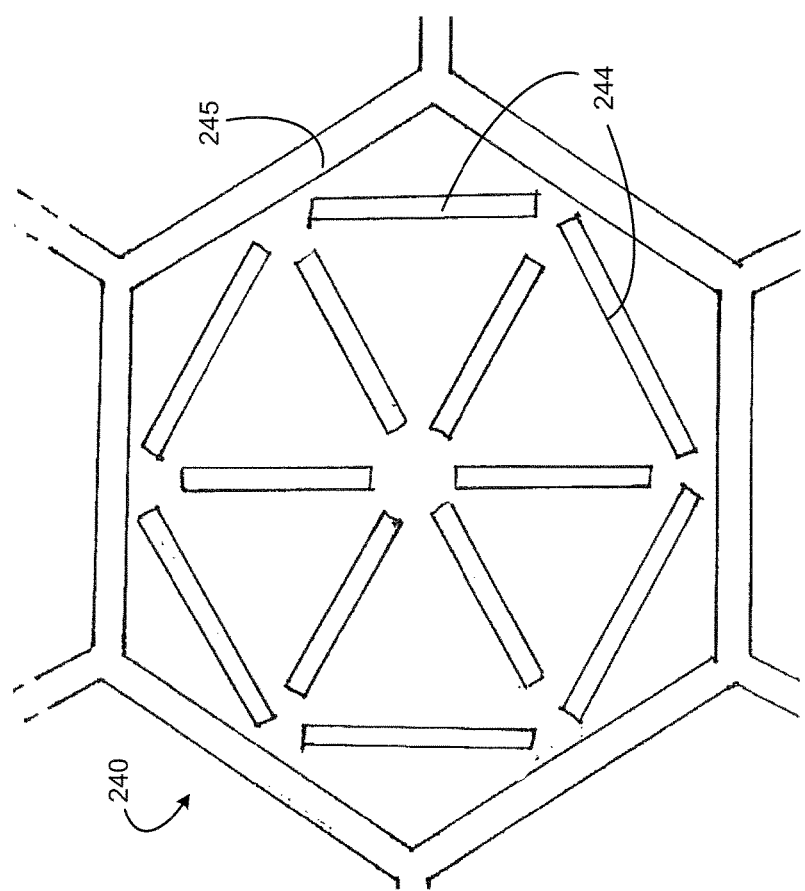

In a variant, shown in top and perspective views in FIGS. 8 and 8A, a top coating layer 240 comprises, stiff, elongated, transparent fibres 244 as the profile elements, and the latter are packed into supporting hexagons 245 in a honeycomb-like arrangement to reflect all light downwards (and possibly back-reflect into the substrate to prevent any light escaping, or cause the reflected light to assume multiple directions, only a very narrow range of which can be detected by the eye at a given position). Fibres 244 are preferably packed or arranged into hexagons 245 in a pseudo-random manner, or in a pattern that contains no extensive periodicity at the <1-2 micron level (to prevent diffraction), and can vary in shape and size depending on the application and other factors. In one example, the fibres and hexagon may have a height of about 2000 nm to 5000 nm, more preferably 3000 nm, and each side of hexagons 245 may have a length of the order of 3000 nm to 7000 nm, more preferably 5000 nm. The hexagons serve also to provide durability, or resistance against abrasion, when handled, as compared to unprotected elements 142 in FIG. 7, for example. In general, it is more energy-efficient to produce equilateral hexagons (and in some cases such hexagons may result, at least in part, from self-assembly—similar to laterally compressed bubbles); however, polygons with a different number of sides or other closed shapes (such as circles) may also be used to achieve similar effects. These structures, due to their larger size, lend themselves well to stamping production techniques. They could be applied to any object requiring reduced reflectivity, such as displays for electronic equipment, glass panels and items of jewellery.

Figure 9:
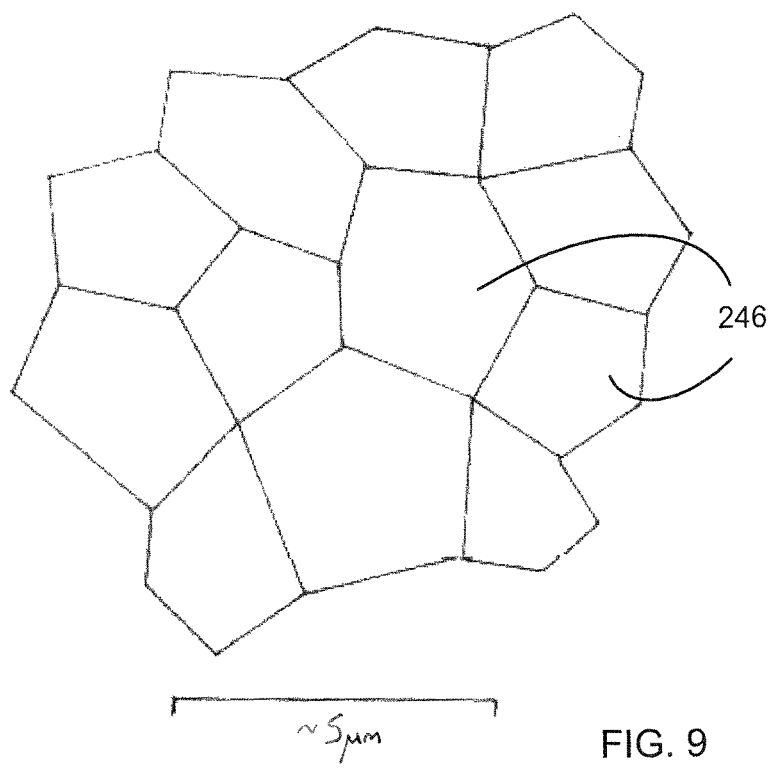
FIGS. 9 and 10 are top views of alternative top layers to that in FIG. 8.
Figure 10:
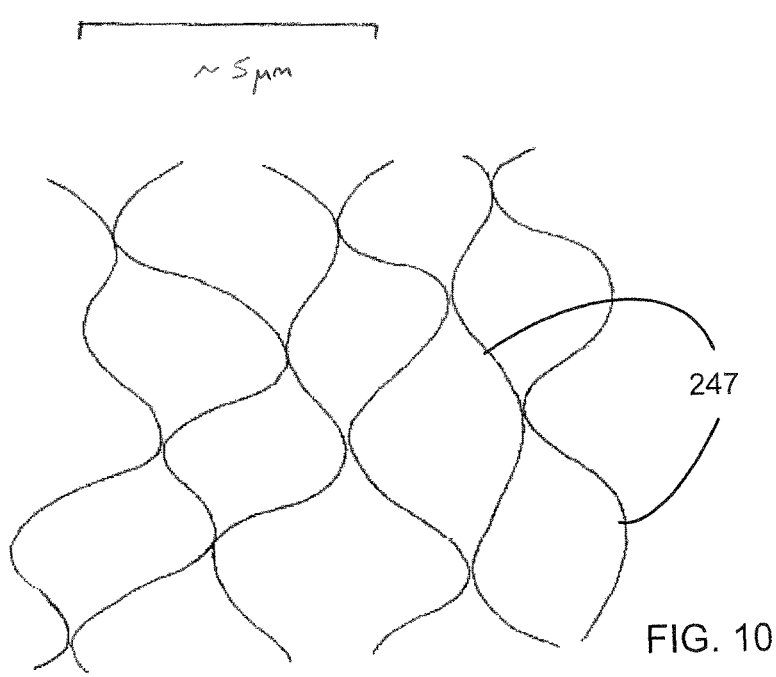

FIGS. 9 and 10 show top views of the top layer 240 according to a variant of FIG. 8, in which supporting hexagons 245 are replaced by profile elements 246 that form either random hexagons, pentagons and/or other polygons of varying shapes and sizes in the order of 2500 nm across (FIG. 9) or randomly curved lines 247 that meet at non-periodic points to form non-uniform spaces that are again (in this example) of the order of 2500 nm across (FIG. 10). As the size of the walls is reduced, in order to avoid diffraction effects, it becomes necessary to randomise or reduce the order in the position of the walls. Here the profile elements are of equivalent relative height and thickness as those of the hexagon walls shown in FIG. 8, although the walls being closer to each other negates the need to have internal fibres enclosed within the hexagons. As can be seen, there is no extensive periodicity in the shape or size of these profile elements.

Figure 11:
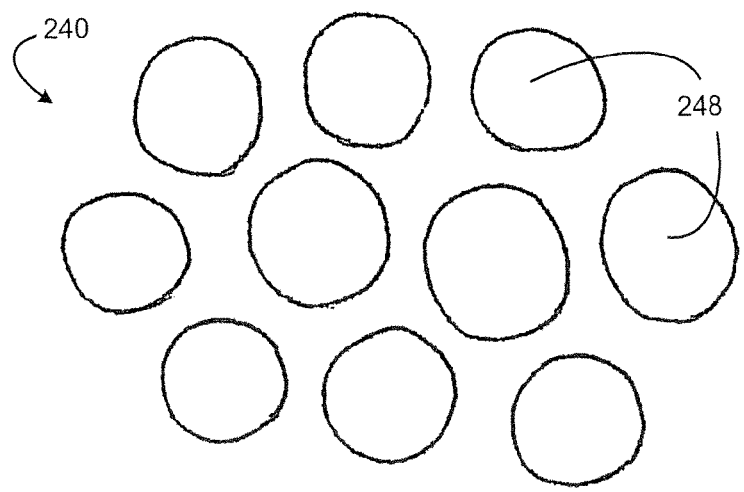
FIGS. 11 and 11A are a top view and a sectional view of another alternative top layer to that of FIG. 8 in yet another embodiment.
Figure 11A:
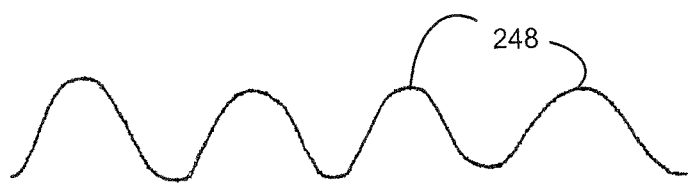

In yet another alternative for covering layer 240 shown in FIG. 11 (top view) and FIG. 11A (cross-sectional view), the layer comprises a close-packed array of up-turned cones 248 that are, for example, 1,500-2,000 nm in diameter. At this size, it is no longer important to prevent extensive periodicity since diffraction becomes effectively unimportant for the visual range of wavelengths. This structure also enables substantially all incident light to be reflected from the sloping sides, downwards (often via multiple reflections), to be absorbed by the black or coloured pigment or dye beneath. The cones here may be considered as depositions or indentations.

In general, the covering layer 240 structures in FIGS. 8, 9, 10 and 11 all advantageously negate high reflectivity from smooth surfaces, particularly at high angles enabling a coated object to taken on a rich matt black (or other) colour that is "velvety" and not shiny.

Figure 12:
FIGS. 12 and 13 are sectional and top views of an exemplary macro structure onto which the above optical structures can be applied.
Figure 13:
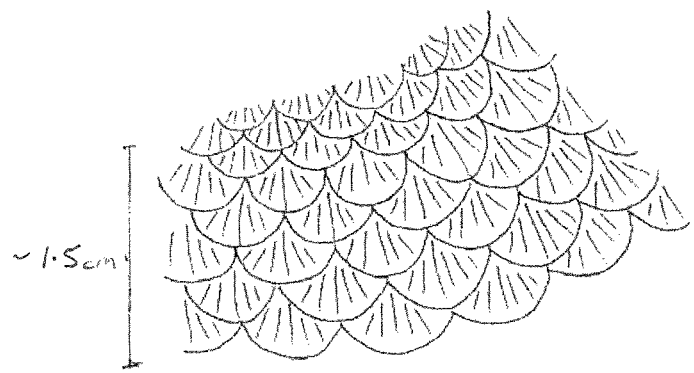

All of the optical coating micro-structures described above can be coated, stamped or otherwise applied on various different types and sizes of objects such as crystals (e.g., figurines or stones) and flakes (e.g., to be applied in paints or cosmetics). It may further be desirable in some applications to combine these optical coating structures with a macro structure, for instance one mimicking the natural appearance of an animal or plant (here, a "macro" structure refers to a structure visible to the unaided eye). For example, a macro structure mimicking (though in an exaggerated manner) the cross-section of a butterfly wing, leaf or feather is illustrated in FIG. 12. By forming such macro structures on the surface of a substrate 55 before forming the optical coating structures (which are generally micron or submicron dimensioned) described above thereon, a desired aesthetic effect can also be achieved. For example, as shown in FIG. 13, a macro pattern of raised or sunken black lines mimicking the edges and barbs of overlapping feathers can be formed on a substrate by depositing or printing, or etching, ridges (or scored lines) with an approximately semi-circular cross-section (for example, about 250 microns in diameter). By carefully selecting the dimensions of the desired macro pattern, its visual effect can be optimized, and in general, the precise designs can vary.

In other embodiments it may be desirable to introduce a pattern into the surface of the object comprising either approximately hemispherical protuberances or approximately hemispherical indentations upon which the optical coating structure can be applied. The indentations may be made into the substrate or into an optically inactive infill material that also forms part of base layer. The indentations or protuberances can be made with an average periodicity of around the 1 micron level (e.g., range of 100 nm to 100 μm), for example using a grit blasting method to provide a desired level of randomness.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. An optical coating structure that has been applied to a surface of an object to impart a desired colour to the object, the optical coating structure comprising a multilayer reflector, the multilayer reflector comprising alternate layers of higher and lower refractive index materials arranged in a stack, the optical coating structure further comprising scattering structures, the scattering structures being sub-micron in size, at least in a height and width dimension, and arranged in non-periodic manner, wherein the scattering structures comprise bars, rods or mixtures thereof having a convexly curved upper surface, wherein the scattering structures are in the form of profile elements that are introduced to a basal layer of the optical coating structure to induce rounded or curved distortion into the multilayer reflector, and wherein the convexly curved upper surface extends to either side of the object surface normal such that the scattering structures have convexly curved sides and are configured to induce rounded or curved distortions into the multilayer reflector such that the layers of the reflector above the profile elements follow a curved path so as to reduce colour change of the multilayer reflector with a changing angle.

2. The structure of claim 1, wherein the profile elements comprise bars of varying length.

3. The structure of claim 2, wherein the profile elements comprise rods with a semi-circular cross section which are of varying length.

4. The structure of claim 2, wherein the profile elements comprise units of substantially oval form in plan view and each having a convexly curved cross section, the units being of varying lengths.

5. The structure of claim 1, wherein the length of the profile elements varies from about 1000 nm to 5000 nm.

6. The structure of claim 1, wherein the profile elements have an average base width of between 50 nm to 500 nm.

7. The structure of claim 1, wherein the profile elements have a height in the range of 25 nm to 250 nm.

8. The structure of claim 1, wherein the profile elements comprise a transparent or black-coloured material having a refractive index which is different to an adjacent layer of the stack reflector by at least 0.5.

9. The structure of claim 1, wherein the optical coating structure includes a covering layer (40) applied to an uppermost layer of the stack reflector.

10. The structure of claim 1, wherein the stack reflector comprises alternating layers of different dielectric materials preferably selected from the group consisting of silicon dioxide, titanium dioxide, zinc sulphide, magnesium fluoride and tantalum pentoxide.

11. The structure of claim 10, wherein the alternating layers of different dielectric materials are selected from the group consisting of silicon dioxide, titanium dioxide, zinc sulphide, magnesium fluoride and tantalum pentoxide.

12. The structure of claim 1, wherein the scattering structures are arranged in a pseudo-random manner where order is detectable only at areas of several microns or greater.

13. The structure of claim 1, wherein the scattering structures have been formed by deposition of material via a printing technique.

14. The structure of claim 1, wherein the scattering structures are formed by stamping.

15. The structure of claim 1, wherein the scattering structures are sized and arranged for scattering visible light.

16. The structure of claim 1, wherein the structure has been applied to a cut glass article, a cut crystal or an article of jewelry, or wherein the structure (2) has been applied to flakes and is incorporated in paint or a cosmetic.

* * * * *